Patented Oct. 14, 1941

2,258,613

UNITED STATES PATENT OFFICE 2,258,613

MEASURING INSTRUMENT

Fabian M. Kannenstine and Francis M. Floyd, Houston, Tex.; said Floyd assignor to said Kannenstine Application May 11, 1938, Serial No. 207,178

3 Claims. (Cl. 265—1.4)

The invention relates to measuring instruments, more particularly to the provision of a cantilever beam suspension type of instrument which is so designed that the effects of temperature and drift are minimized.

The principal object of the invention is to provide a measuring instrument in which a mass is resiliently supported to respond in a predetermined manner to forces acting thereon.

Another object is to provide a device of the class described in which there is applied a force of such magnitude and direction as to compensate for the variation in stiffness of the beam with change in temperature.

Another object is to provide a device of the class described in which the resilient support is so designed as to have a substantially uniform stress throughout its length.

Another object is to provide a measuring instrument in which a mass is resiliently supported closely adjacent a base member, such mass and member being so constructed that the distance therebetween may be accurately determined.

Still another object is the provision of a novel construction whereby the effects of forces acting on the instrument may be determined electrically.

Other and further objects will be apparent from the following description taken in connection with the drawing in which.

In the cantilever beam type of gravity meter a mass is supported by a cantilever beam and if all extraneous effects are removed the deflection of the mass is substantially proportional to the gravitational attraction at that point. Various factors limit the useful sensitivity of such an instrument, one of such factors being the change in the stiffness of the beam with change in temperature. Even where the beam substance is selected with a view of minimizing such change it has still been necessary to provide extremely accurate temperature regulating equipment in order to obtain sufficiently accurate information to be of value. For example, in instruments constructed of one of the most suitable spring materials it has been found necessary to maintain the temperature constant within .001° C. in order to obtain a value of $g$, which is accurate to one part in ten million.

In obtaining this desired condition heretofore the weight, bulk, and complication of equipment has been objectionable. This is particularly true in instruments used in the gravitational method of geophysical prospecting, where high accuracy is necessary and at the same time it is also necessary that the instrument be readily transportable from one point to another. These difficulties and others are avoided in accordance with the present invention. While the following description refers specifically to a gravity measuring instrument in illustrating the invention, it is to be understood that the invention is of utility in any instrument wherein a resiliently supported mass is utilized.

Figure 3:
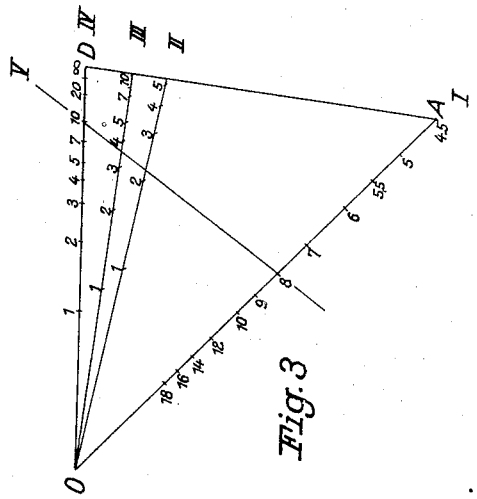
Fig. 3 is an elevation of a modification in which desired indications are obtained electrically.
Figure 4:
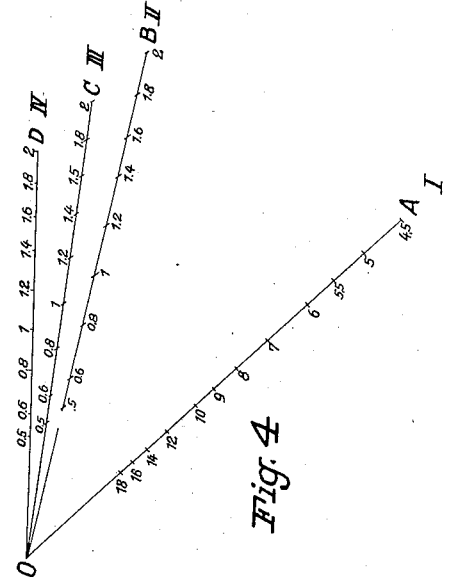
Fig. 4 shows a modified construction for obtaining desired indications electrically.
Figure 1:
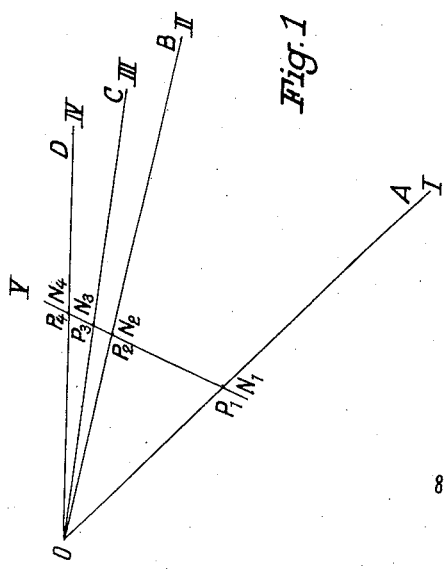
Fig. 1 is an elevation of one form of construction embodying the invention.
Figure 2:
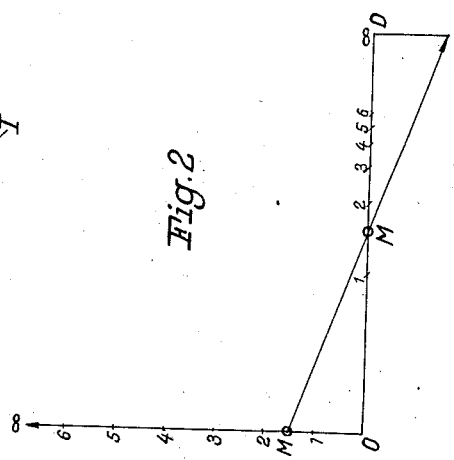
Fig. 2 is a plan view of the construction shown in Fig. 1.

In Fig. 1 of the drawing there is shown a gravity measuring instrument which comprises essentially a support 1 upon which is mounted a member 2, which may be considered as a cantilever beam folded at 28 and which supports a mass 3, upon its free end. The fixed end of the member 2 is attached to a base member 4, held in a fixed position upon projections 5 on the support 1 by means of springs 6, secured to the support as by screws 7. The mass 3 and the base member 4 are closely juxtaposed so that there is desired damping of relative movement between these elements when the instrument is used for its intended purpose.

The nether face 10 of the mass 3 and the upper face 11 of the base 4 are coated with such thickness of a suitable reflecting material that they constitute semi-transparent mirrors. By using these mirrors as an interferometer the distance between the beam supported mirror or mass 3 and the fixed mirror or base member 4 may be accurately determined and by suitable calibration and calculation the value of $g$ corresponding to this distance may be determined.

Beam 2 may be of any suitable material, such as fused quartz or an alloy having a small temperature coefficient of elasticity. Suitable materials have either a positive or negative temperature coefficient of elasticity and the instrument just described is therefore affected by changes in temperature. In order to compensate for the changes incident to change in temperature a temperature-responsive element 20 is mounted near the free end 21 of beam 2. This element is shown as a liquid-in-glass type in which a lower enlargement or bulb 22 is filled with an expansible fluid 23 which rises in the capillary bore 24 a distance which depends on the temperature to which the supported in closely spaced relation with the base member, said beam lying in a vertical plane, the lower and upper limbs of the beam being of such different cross sections that they are relatively stiff and flexible respectively, whereby the upper limb serves as a cantilever beam to support the mass, and means for measuring the distance between the mass and member as a measure of the forces acting upon the mass.

2. A force measuring instrument of the class described comprising a base member, a mass, and a substantially U-shaped beam extending horizontally and having its ends attached to said member and mass respectively so that the mass is supported in closely spaced relation with the base member, said beam lying in a vertical plane, the lower limb of the beam being of rigid construction and having the upper limb attached thereto at its outer end, said upper limb being flexible and so constructed and arranged that the stress is substantially uniform throughout the length thereof.

3. A force measuring instrument of the class described comprising a base member, a mass, a support and a cantilever beam having its ends attached to said support and mass respectively to support the mass closely adjacent the base member, said cantilever beam being tapered in cross section toward its free end so that the stresses in the beam are constant throughout its length.

FABIAN M. KANNENSTINE.
FRANCIS M. FLOYD.

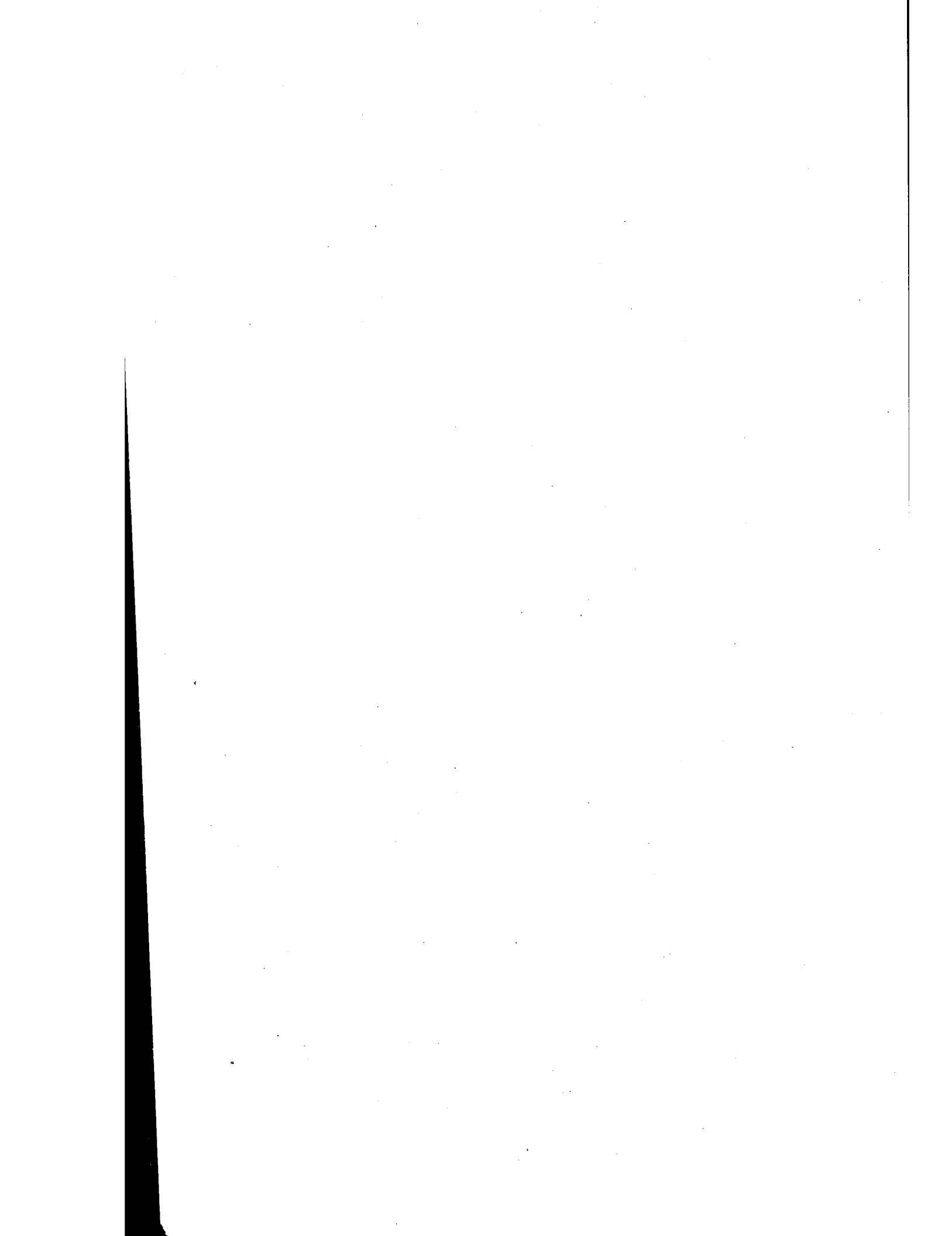

Oct. 14, 1941.                B. UFFRECHT                 2,258,635
                          ADJUSTMENT OF CAMERAS
                          Filed Aug. 5, 1938              3 Sheets-Sheet 1

Inventor:
Bernhard Uffrecht.